United States Patent [19]

Ikegami et al.

[11] Patent Number: 5,376,392
[45] Date of Patent: Dec. 27, 1994

[54] FOOD PACKAGING BAG

[75] Inventors: Shigeyoshi Ikegami, Kawaguchi; Hisashi Kojyoh, Yatushiro; Iu Uchida, Tokyo; Tadayoshi Yamazaki, Tokyo; Toshiaki Miyajima, Tokyo, all of Japan

[73] Assignee: Kohjin Co., Ltd., Tokyo, Japan

[21] Appl. No.: 839,763

[22] PCT Filed: Aug. 13, 1990

[86] PCT No.: PCT/JP90/01030

§ 371 Date: May 5, 1992

§ 102(e) Date: May 5, 1992

[87] PCT Pub. No.: WO92/03355

PCT Pub. Date: Mar. 5, 1992

[51] Int. Cl.$^5$ .............. B32B 7/10; B65D 30/02
[52] U.S. Cl. .................. 426/127; 206/204; 383/103; 383/113; 383/116; 426/234; 426/412; 428/34.3; 428/35.4; 428/36.5; 428/36.6; 428/138; 428/317.1; 428/319.7; 428/319.9; 428/349; 428/354
[58] Field of Search ........... 426/113, 127, 234, 412; 206/204; 383/103, 109, 113, 116; 428/34.3, 35.2, 35.4, 35.7, 36.5, 36.6, 137, 138, 347, 349, 354, 480, 483, 516, 517, 317.1, 319.7, 319.9

[56] References Cited

U.S. PATENT DOCUMENTS

| | | |
|---|---|---|
| 4,316,070 | 2/1982 | Prosise et al. |
| 4,879,124 | 11/1989 | Oberle .............. 426/113 |
| 5,128,182 | 7/1992 | Bunker et al. .......... 428/34.3 |

FOREIGN PATENT DOCUMENTS

| | | | |
|---|---|---|---|
| 282875 | 9/1988 | European Pat. Off. ...... 428/138 |
| 293603 | 12/1988 | European Pat. Off. |
| 358461 | 3/1990 | European Pat. Off. ...... 428/138 |
| 2205042 | 5/1974 | France |
| 2428583 | 1/1980 | France |
| 2306890 | 8/1974 | Germany |
| 58-116666 | 7/1983 | Japan |
| 58-134980 | 8/1983 | Japan |
| 59-117382 | 8/1984 | Japan |
| 62-275415 | 11/1987 | Japan |
| 62-191675 | 12/1987 | Japan |
| 63-92316 | 4/1988 | Japan |
| 63-18607 | 5/1988 | Japan |
| 63-178970 | 7/1988 | Japan |
| 64-26655 | 1/1989 | Japan |
| 64-47677 | 3/1989 | Japan |
| 2-129043 | 10/1990 | Japan |

OTHER PUBLICATIONS

Supplementary European Search Report (dated Apr. 13, 1994).

*Primary Examiner*—Leo B. Tentoni
*Attorney, Agent, or Firm*—Varndell Legal Group

[57] ABSTRACT

The present invention relates to a food packaging bag comprising a water-resistant perforated sheet part which composes of at least a part of an outer layer of the bag, a moisture permeable waterproof film which is laminated by bonding in part to an inside of the perforated sheet part as an inner layer to form a moisture permeable waterproof part, and a waterproof sheet part which composes of the rest of the outer layer part. Further, when, if desired, an absorbent sheet layer is provided on at least a part of the inside of the waterproof sheet part, the functions of the moisture permeable waterproof film such as moisture permeability are scarcely impaired when the packed food is heat-cooked, and the moisture permeable waterproof film weak in strength is seldom broken by scraping distribution or bursting during cooking with heat. Unsticky, particularly the bottom of the food being unsticky too, as to the bag having the absorbent sheet at the bottom, and hot cooked foods can be obtained through the processes wherein the food is packed in the bag, the opening is completely heat-sealed and it is put into hot water, or the bag is heated in a microwave oven to steam cook, or the bag is untightly sealed by simply folding or using lavels and it is heat-cooked in the microwave oven to heat-cook.

20 Claims, 2 Drawing Sheets

FOOD PACKAGING BAG

TECHNICAL FIELD

The present invention relates to a novel packaging bag, and more particularly to a packaging bag having a proper moisture permeability when, for instance, a material food packed in the bag is heat-cooked in a microwave oven (high frequency electromagnetic wave heating cooker) or is stem-cooked by completely sealing and putting into hot water, and capable of cooking without causing dew condensation in the inside.

BACKGROUND ART

When a food has, hitherto, been cooked with heat in a home, the food was wrapped up in a wrapping film for home use or was packed in an air or moisture impermeable packaging bag and was sealed, and it was heated in a microwave oven. In such a case, moisture contained in the food was evaporated and thus, was burst the bag by an internal pressure. Even if the bag was not burst, the food became sticky due to dew condensation, and its taste was impaired. Then, there is disclosed a cooking method wherein a food is packed in, as a food packaging bag utilized in cooking using a microwave oven, a two-layer packaging bag comprising an inner packaging material composed of an air permeable material such as a perforated film or a non-woven fabric and an outer packaging material composed of an air impermeable film which acts so as not to enter dust into the inside, as proposed in Japanese Examined Utility Model Publication No. 63-18607, and when cooking it in a microwave oven, after a part encompassed by a perforation, which is provided on a part of the outer packaging material, is removed, and it is cooked.

On the other hand, in Japanese Unexamined Patent Publication No. 58-116666 and No. 58-134980, there is disclosed a preparation method of a packed food wherein a food is packed in a finely porous material on which fine holes are innumerably perforated, provided for escaping steam generated on heat-cooking out of the bag to prevent an increase of the internal pressure and for preventing an invasion of microorganisms from the outside, and then is subjected to sterilization with heat treatment.

Also, in Japanese Unexamined Utility Model Publication No. 59-117382, it is disclosed to use a finely porous polyethylene film which is permeable to steam but is impermeable to water as a packaging material for food to be steam-cooked.

Also, in Japanese Unexamined Patent Publication No. 63-92316, there is disclosed a sheet or bag for cooking comprising a water-repellent and porous sheet having steam permeability.

Also, in Japanese Unexamined Utility Model Publication No. 62-191675, there is described a method wherein a water-absorbent sheet previously containing a necessary amount of water is provided at a bottom part of a packaging bag, and steam is generated in the inside of the packaging bag on heat-cooking, thereby preventing to dry a food, as a result, the steam-cooking can be conducted.

The packaging material of Japanese Examined Utility Model Publication No. 63-18607 has, however, a superposition structure of an inner layer composed of a perforated material which is incompletely waterproof such as a synthetic film having a large number of circular small holes, a synthetic resin non-woven fabric or synthetic resin net, and an outer layer composed of a film having a part encompassed by a perforation, which is to be removed. On cooking, it is necessary that a part of the outer layer film is cut and removed, which is troublesome. Also, since the perforated material of the inner layer is bonded to the outer layer which is impermeable to moisture excepting for the part to be cut and removed, steam generated on heat-cooking cannot go out into the outside. That is, the effect obtained by using the perforated material as the inner layer can insufficiently be exhibited. Furthermore, there is a case where steam passing through the perforated material of the inner layer is condensed to produce water, and the water reverses through the perforated material part which is incompletely waterproof into the inside again, so the effect of dissolving that the food in the bag becomes sticky can be insufficiently exhibited.

On the other hand, the bags using, as the moisture permeable layer, the finely porous film or sheet which is permeable to steam but is impermeable to water, and is water-repellent alone, as discussed in Japanese Unexamined Patent Publication No. 58-116666 and No. 58-134980, Japanese Unexamined Utility Model Publication No. 59-117382, and Japanese Unexamined Patent Publication No. 63-92316, are easily broken during distribution and heat-cooking, that is, they are practically unsatisfactory as the commodities. On the other hand, as a solving means of the problem that the strength is weak, it can be considered that the strength reinforcement can be improved by putting another air permeable material which is excellent in strength such as a non-woven fabric, a woven fabric, a perforated film, a cross-overlaying sheet or a net over the film or sheet on the whole, using an adhesive or by heat-sealing. However, according to such a means, the functions existing in the finely porous film such as moisture permeability are impaired, and there is a defect that the cost of the packaging material is increased because the step for laminating is increased.

Also, the packaging bag wherein the water-absorbent sheet previously containing water is provided on the bag, as discussed in Japanese Unexamined Utility Model Publication No. 62-191675, has no particular hindrance during storage and transportation in case of packaging a frozen food, because water is frozen. However, in case of storing or transporting a non-frozen food, the bag gives a problem that the food of the content is wet with water contained in the sheet. Also, if the food contains originally water, it is not required to contain water in the sheet.

DISCLOSURE OF THE INVENTION

The present invention dissolves the abovementioned defects, and provides a food packaging bag capable of suitably cooking without obtaining the sticky food due to dew condensation and without impairing the taste of the food, or a food packaging bag capable of steam cooking by completely sealing the opening part and putting it into hot water as it is.

That is, the present invention relates to a food packaging bag comprising a water-resistant perforated sheet part which composes of at least a part of an outer layer of the bag, a moisture permeable waterproof film which is laminated by bonding in part to an inside of the perforated sheet part as an inner layer to form a moisture permeable waterproof part, and a waterproof sheet part which composes of the rest of the outer layer part, and, when desired, further comprising an absorbent sheet layer which is provided on at least a part of the inside of the waterproof sheet part.

The waterproof sheet used in the present invention is not particularly limited so long as it is a sheet material having waterproof property. Practically, there are preferably used, for instance, a heat-sealable waterproof sheet wherein a paper is coated with a polyolefin resin, a heat-sealable waterproof sheet wherein a plastic film such as a polyethylene terephthalate film or a polypropylene film is coated with a heat-sealable resin, and the like. Usually, a film having a thickness of not less than 10 μm is used. Also, a material used in the water-resistant perforated sheet part used in the present invention is not particularly limited so long as it is a water-resistant sheet material which is air permeable. It is possible to use a perforated film, or an air permeable sheet such as a perforated film, e.g. a sheet obtained by perforating a paper substrate coated with a heat-sealable resin, a non-woven fabric, a woven fabric, a cross-overlaying sheet or a net. Practically, there are preferable a sheet obtained by perforating a heat-sealable waterproof sheet which is a paper coated with a polyethylene resin, and a sheet obtained by perforating a heat-sealable waterproof sheet which is a plastic film coated with a polyethylene resin. Among them, it is particularly preferable that a part wherein a part of the above-mentioned waterproof sheet is perforated is used as the perforated sheet part.

As a method for perforating the sheet or film material, there are applicable, for instance, a melting method using a heating needle, a perforating method using laser, a punching, and the like. The shape, size and the number of the holes to be shaped might be suitably selected according to the packaging use. When the occupied area of the holes is too large, the film strength is lowered, and the reinforcing effect of the film is impaired. When the occupied area is too small, the properties such as the moisture permeability and the air permeability are lowered, in case of overlapping the moisture permeable waterproof film. Accordingly, as to the hole size and the shape, a circular hole having a size of about not less than 0.1 mm to less than 30 mm is preferable, and it is desirable that the area of the holes occupys from about not less than 0.1% to less than 15% of the sheet. Also, it is usual to use the sheet or film material having a thickness of about not less than 10 μm The moisture permeable waterproof film which is the inner layer used in the present invention is not particularly limited so long as it is a material which is permeable to steam but is impermeable to water being a liquid. There are preferable materials having as the properties, an air permeability according to JIS P 8117 of not more than 2000 seconds/100 ml and a moisture permeability at 95° C. according to A2 method of JIS L 1099 of not less than 10 g/m$^2$/minute. As such a material, there is exemplified a finely porous film obtained by at least uniaxially stretching a polyolefin sheet containing fine particles of silica, calcium carbonate, and the like. Among them, as described in Japanese Unexamined Patent Publication No. 1-26655, there is particularly preferable a finely porous, heat sealable film obtained by at least uniaxially stretching a polyolefin sheet containing polyethylene terephthalate fine particles, which are finely dispersed by admixing, as a resin incompatible with a polyolefin, a polyethylene terephthalate having an intrinsic viscosity of not more than 0.5 with a polyolefin resin having heat sealability and kneading, because the fine particles do not fall out therefrom, and both the moisture permeability and the waterproof property are excellent, so the film is the well-balanced material.

In the present invention, as the air permeability, a value according to JIS P 8117 and as the moisture permeability, a value according to the A2 method at 95° C. of JIS L 1099 are adopted. In case of food packaging bags for cooking in a microwave oven, there are preferable moisture permeable waterproof films having an air permeability of not more than 2000 seconds/100 ml and a moisture permeability of not less than 10 g/m$^2$/minute. Moisture permeable waterproof films having an air permeability of more than 2000 seconds/100 ml are not preferable, because moisture in the food evaporates out of the bag during distribution or storaging to cause the drying or loss in weight. Films having a moisture permeability of less than 10 g/m$^2$/minute are not preferable, because, when cooking a food, steam generated from the food can insufficiently escape into the outside and is condensed in the inside, so the taste of the food is impaired.

The moisture permeable waterproof film as mentioned above is generally opaque due to the presence of the fine holes. So, the content cannot be confirmed with eyes through the part. If it is desirable that the content can be confirmed with eyes, it is preferable to use a transparent waterproof sheet having a thickness of not less than 10 μm which is a plastic film as a base material in the waterproof sheet other than the perforated film part.

When the moisture permeable waterproof film is overlapped on the inside of the above-mentioned perforated sheet part, the both layers must be bonded to each other in part, not in whole. It is preferable that the layers are heat-sealed substantially only around the perforated sheet part. In such a case, they might be bonded in part in the state of dots or in a line within the range such that the most of the fine holes in the inside of the moisture permeable waterproof film are not covered.

The absorbent sheet provided on the inside of the bag according to the desire is a sheet provided for absorbing water which is generated by condensing steam generated during heat-cooking the packed food in the bottom part impermeable to steam, or the flowing oil or sauce in heating. It is not necessary to limit its structure. As a preferable structure, there are exemplified structures composed of an obverse layer which is permeable and heat-adhesive, its inside layer which is absorbent and a reverse layer which is a non-woven fabric, woven fabric or paper having heat-sealability, and the like. For instance, there is proposed a laminated non-woven fabric having a structure composed of a heat-sealable fiber sheet layer, a pulp paper layer and a mixed layer of an absorbent fiber such as a rayon and a heat-sealable fiber, in that order from a side bonded to the waterproof sheet. When this sheet is a sheet wherein both the heat-sealable fiber sheet layer and the waterproof sheet have heat-sealability, since they are heat-sealed to each other, not only it is easy to set in the bag but also it is not required to use an organic adhesive. Further, it is remarkably excellent for the health, since the adhesive is not used on the surface of the sheet contacted with a food. Among them, in case where an excellent water absorbancy is required, for instance, a food containing a particularly a large amount of water is packed, it is preferable that a highly water-absorbent material is contained in the pulp paper layer of the intermediate layer. As the highly water-absorbent material, there are preferable materials which are not dissolved by absorbing water, such as highly water-absorbent polymer materials.

Methods for preparing the food packaging bag of the present invention from the water-resistant sheet, the waterproof perforated sheet and the moisture permeable waterproof film are not particularly limited. When each of the sheets and films is not heat-sealable, they are bonded by using an adhesive. When using the material wherein the parts to be bonded to each other are heat-sealable, as mentioned above, it is preferable to heat-seal from the viewpoints of efficiency or sanitarium.

The heat-sealing method is suitably selected and is used from among methods, for instance, a sealing with a hot bar, impulse heat sealing, side welding, and the like, in view of a bag making machine or a shape of bag.

As the bonding of the water resistant perforated sheet part to the moisture permeable waterproof film, a method wherein each material is previously bonded to each other by using an offline machine so as to be a state dotted with the bonded parts to laminate, but a laminating step is increased and the effect of the present invention is decreased. So, it is more preferable that the perforated part is bonded to the film at only the necessary fringe parts of the moisture permeable waterproof film during making bags and/or sealing. Since the moisture permeable waterproof film substantially comes into contact with the water-resistant perforated film, the outer layer, steam moves horizontally a little, and even if steam moves, it does not enter into the inside of the bag again, there is no trouble. Accordingly, it is not necessary to heat-seal the whole of the fringes, excepting for the case where the strict sealability is required, for instance, a case where a food is steam cooked by sealing and putting into hot water.

The packaging bag comprising the above-mentioned structure materials can be applied in any shape such as a two side-sealed bag, a three side-sealed bag or a gusset bag. Also, automatically filling package can be applied.

BEST MODE FOR CARRYING OUT THE INVENTION

The present invention is more concretely explained by means of Examples. The present invention is not limited to the Examples.

Figure 1:
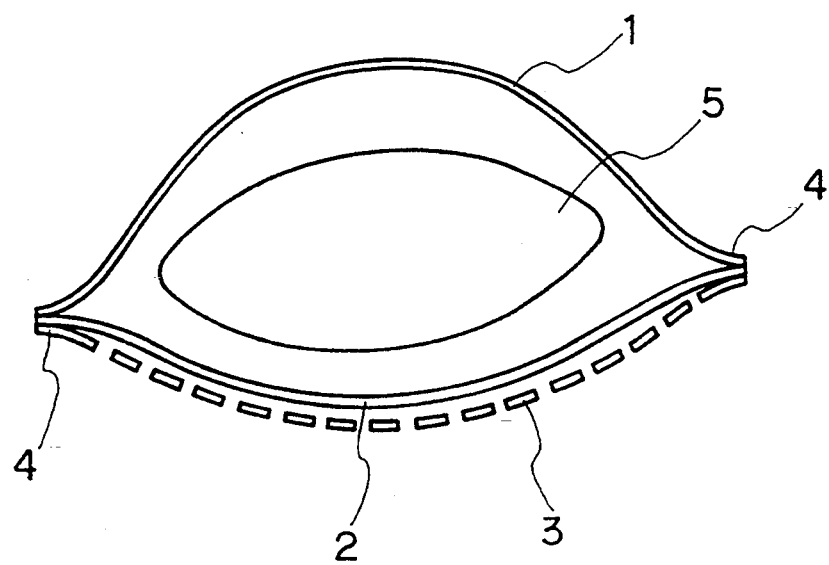
FIG. 1 is a cross-sectional view illustrating a structure of a packaging bag of Example 1.

Figures and signs in the figures are as follows:

FIG. 1 is a cross-sectional view illustrating a structure of a packaging bag of Example 1.

Figure 2:
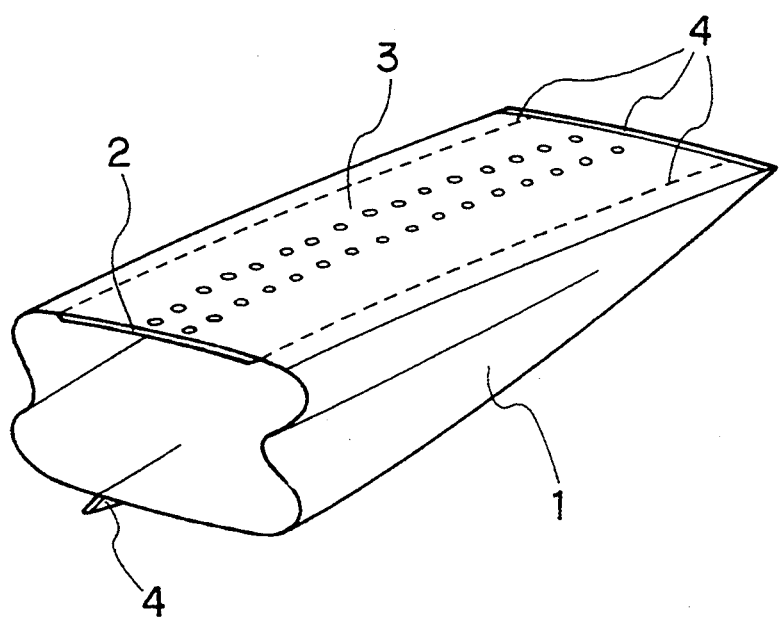
FIG. 2 a schematic view illustrating a structure of a packaging bag of Example 2.

FIG. 2 is a schematic view illustrating a structure of a packaging bag of Example 2.

Figure 3:
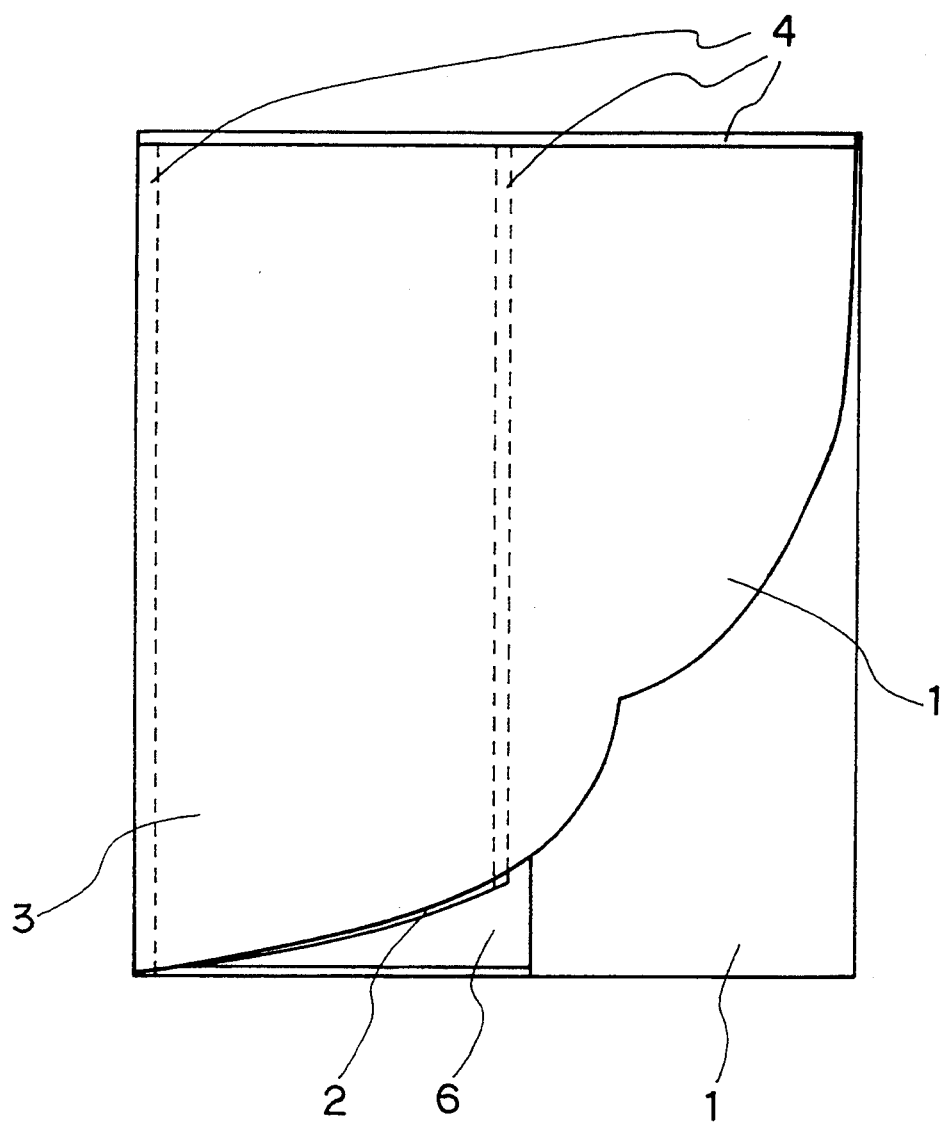
FIG. 3 a schematic view illustrating a structure of a packaging bag of Example 4.

FIG. 3 is a schematic view illustrating a structure of a packaging bag of Example 4.

1. Waterproof sheet
2. Moisture permeable waterproof film
3. Water-resistant perforated sheet
4. Heat-sealed part
5. Food
6. Absorbent sheet

Example 1

A three side-sealed bag having an inner size of 10 cm×20 cm and having a cross-section shown in FIG. 1 was made by means of impulse heat-sealing, using a three side-sealed bag wherein one side is a non-stretched linear low density polyethylene film having a thickness of 40 μm (made by Kohjin Co., Ltd., KOHJIN L Ace L-type) which was a waterproof sheet and the other side is a moisture permeable layer, and Anapoly B-type made by Shin-Nippon ALC Kogyo Kabushiki Kaisha (film thickness: 40 μm, hole size: 0.4 mmφ, occupied area of holes: 6.4%) being used as a waterproof perforated film which was an outer layer and a finely porous polyethylene film having a film thickness of 40 μm, an air permeability of 300 seconds/100 m l and a moisture permeability of 55 g/m²/minute being used as a moisture permeable waterproof film which was an inner layer. A commercially available hot dog was put in the bag and the opening part was heat-sealed, similarly, by impulse heat sealing to give a sealed package of the food in the state of a four sided bag. The sealing strength of the heat-sealed part (according to ASTM D 882) was 1.2 kg/15 mm-width.

Next, the above-mentioned food package was put in a microwave oven (made by Matsushita Denki Kabushiki Kaisha) so as to set the side having the perforated sheet part up, and it was heated and cooked for 30 seconds by applying 600 W of electric power. After heating, the food package and the hot dog were observed. The hot dog could be cooked without bursting of the bag, the surface of hot dog was unsticky, and the taste was good.

Comparative Example 1

A food package was prepared in the same manner as in Example 1 except that only the moisture permeable waterproof film which was the inner layer was used as the moisture permeable layer side, without using the water-resistant perforated film. The sealing strength of the heat-sealed part was 0.6 kg/15 mm-width.

Next, the above-mentioned food package was heat-cooked in the same manner as in Example 1. After 30 seconds, the inner pressure was increased due to stem generated from the hot dog, and the food package was broken at the heat-sealed edge.

Example 2

Commercially available frozen foods, shao-mai were put in a three side-sealed bag which was prepared in the same manner as in Example 1, and the opening part of the bag was completely heat-sealed. The bag was put into boiling hot water and was placed for 5 minutes. Immediately after treating, the bag was taken out from hot water and was opened, and the shao-mai were eaten. As a result, moisture permeated into the inside of the shao-mai, and the shao-mai was a shao-mai having an excellent taste such as nice and soft, hot and pleasant to the palate, and unsticky on the surface.

Comparative Example 2

Frozen foods, shao-mai were sealed in a three side-sealed bag, into hot water and treated for 5 minutes in the quite same manner as in Example 2 except that the bag prepared in Example 2 was changed to a three side-sealed bag prepared from a non-stretched polypropylene film having a thickness of 40 μm. The shao-mais were eaten, likewise. Although the surface of the chao-mai was heated, the inside was insufficiently hot, and the surface was dry to some degree, that is, the shao-mai had unsatisfactory taste.

Example 3

In case of preparing a gusset bag, a heat-sealable waterproof paper having a width of 340 mm and a length of 220 mm, wherein a polyethylene resin was extrusion coated in a thickness of 25 μm on a paper substrate having a basis weight of 35 g/cm³ was used, and a belt-shaped range having a width of 70 mm was perforated (hole size 0.5 mmφ, occupied area of 0.8%) at the center of the width direction and the part was used as a water-resistant perforated sheet part, and a part which was not perforated was used as a waterproof sheet.

The polyethylene resin coating side of the water-resistant perforated sheet part was covered with a finely porous polyethylene film having a width of 80 mm, a length of 220 mm, a thickness of 40 μm, an air permeability of 300 seconds/100 ml and a moisture permeability of 55 g/m²/minute as a moisture permeable waterproof film, and it was heat-sealed in a width of 3 mm by means of hot bar sealing method, subsequently, similarly, a gusset bag shown in FIG. 2 was made by means of hot bar sealing method. The area of the water-resistant perforated sheet part of this bag amounted to about 23% of the total surface area of the bag. Then, a commercially available hamburger was put in the bag, the opening part of the bag was folded down, and it was sealed untightly with a label to give a food package in the state of the gusset bag.

Subsequently, the above-mentioned food package was put in a microwave oven made by Matsushita Denki Kabushiki Kaisha so as to set the perforated sheet part up and was cooked with heat for 30 seconds by applying 600 W of electric power. After heating, the food package and the hamburger were observed. The surface of the hamburger was unsticky and the taste was good. The bottom was slightly sticky.

Example 4

A water-resistant perforated sheet part was formed by perforating (hole size 0.5 mmφ, occupied area of the holes 0.8%) a belt-shaped range having a width of 110 mm from a center which was situated right of the center of a continuous heat-sealable waterproof paper having a width of 440 mm wherein a polyethylene resin was coated on a paper substrate having a basis weight of 30 g/cm³ in a thickness of 25 μm, and a part which was not perforated was used as a waterproof sheet.

The polyethylene resin coating side of the water-resistant perforated sheet part was covered with a finely porous polyethylene film having a width of 120 mm, a thickness of 40 μm, an air permeability of 300 seconds/100 ml and a moisture permeability of 55 g/m²/minute as a moisture permeable waterproof film, and separately the continuous seat-sealable waterproof paper was covered with an absorbent sheet having a width of 120 mm, which was composed of a heat-sealable fiber sheet layer, a pulp paper layer and a mixed layer of rayon and a heat-sealable fiber in a width of 120 mm from the center which was situated left of the center. The finely porous polyethylene film was heat-sealed at the both sides in a width of 3 mm by means of hot bar sealing method and the absorbent sheet was heat-sealed all over the surface, and it was folded in two at the center line and was heat-sealed at intervals of a length of 22 cm in 10 mm-width in the direction of a width to give a packaging bag wherein the one side was folded, the one side was sealed and the two sides were open. A commercially available hamburger was put in the bag and the opening parts were folded so as to wrap them in the bag to give an untightly sealed food package.

Subsequently, the food package as mentioned above was put in a microwave oven made by Matsushita Denki Kabushiki Kaisha so as to set the perforated sheet part up and was heat-cooked for 30 seconds by applying 600 W of electric power. After heating, the food package and hamburger were observed. The bottom of the hamburger was unsticky, too, and the taste was good.

Technical Application

The bag made as above comprises the water-resistant perforated sheet part which composes of at least a part of the outer layer of the bag, the moisture permeable waterproof film which is laminated by bonding in part to the inside of the perforated sheet part as the inner layer to form a moisture permeable waterproof part, and the waterproof sheet part which composes of the rest of the outer layer. When the food to be cooked such as hamburgers, buns with a bean-jam filling, shao-mais or rice boiled together with red beans is put in the bag, the functions of the moisture permeable waterproof film such as moisture permeability are scarcely impaired, and the moisture permeable waterproof film weak in strength is seldom broken by scraping or bursting during distribution or cooking with heat. Unsticky hot cooked food can be obtained through the processes wherein the opening part of the bag is completely heat-sealed and put into hot water or the bag is heated in a microwave oven to steam cook, or the bag is tightly sealed, such as folding or label sticking at opening part and is heat-cooked in a microwave oven. In such a case, if the absorbent sheet layer is provided on at least a part of the inside of the water-resistant sheet part and the food is heat-cooked so as to set the food on the sheet, the cooked food whose bottom is unsticky and which has good taste can be obtained.

Particularly, when the waterproof sheet, the water-resistant perforated sheet and the moisture permeable waterproof are the heat-sealable materials, the lamination of the water-resistant perforated waterproof sheet with the moisture permeable waterproof film and the bag making can be conducted at the simultaneous time during making the bag.

We claim:

1. A food packaging bag comprising an outer layer formed in a shape of bag, said bag having an opening for receiving food therein, said outer layer including a waterproof section with perforations and a nonperforated waterproof section, and a moisture permeable waterproof film bonded in part to an inner surface of said waterproof section with perforations and covering said perforations.

2. A food packaging bag comprising an outer layer formed in a shape of bag, said bag having an opening for receiving food therein, said outer layer including a waterproof section with perforations and a nonperforated waterproof section, an inner layer of absorbent material provided on at least part of said nonperforated waterproof section, and a moisture permeable waterproof film bonded in part to an inner surface of said waterproof section with perforations and covering said perforations.

3. The food packaging bag of claim 1, wherein said outer layer is made of a single waterproof sheet formed in a shape of a bag.

4. The food packaging bag of claim 2 wherein said outer layer is made of a single waterproof sheet formed in a shape of a bag.

5. The food packaging bag of claim 1, wherein said waterproof section with perforations is a perforated water-resistant sheet and said nonperforated waterproof section is a nonperforated waterproof sheet, said sheets respectively having first and second ends, and said first ends and said second ends are respectively closed together into said outer layer formed in a shape of a bag.

6. The food packaging bag of claim 2, wherein said waterproof section with perforations is a perforated water-resistant sheet and said nonperforated waterproof section is a nonperforated waterproof sheet, said sheets respectively having first and second ends, and said first ends and said second ends are respectively closed together Into said outer layer formed in a shape of a bag.

7. A method for cooking a food which comprises packaging a food to be cooked in a food packaging bag comprising an outer layer formed in a shape of bag, said bag having an opening for receiving food therein, said outer layer including a waterproof section with perforations and a nonperforated waterproof section, and a moisture permeable waterproof film bonded in part to an inner surface of said waterproof section with perforations and covering said perforations, sealing said packaging bag with said food contained therein, and putting said packaging bag into hot water.

8. A method for cooking a food which comprises packaging a food to be cooked In a food packaging bag comprising an outer layer formed in a shape of bag, said bag having an opening for receiving food therein, said outer layer including a waterproof section with perforations and a nonperforated waterproof section, and a moisture permeable waterproof film bonded in part to an inner surface of said waterproof section with perforations and covering said perforations, and heat-cooking said food by high frequency electromagnetic wave heating.

9. A method for cooking a food which comprises packaging food to be cooked in a packaging bag comprising an outer layer formed in a shape of bag, said bag having an opening for receiving food therein, said outer layer including a waterproof section with perforations and a nonperforated waterproof section, an inner layer of absorbent material provided on at least part of said nonperforated waterproof section, and a moisture permeable waterproof film bonded in part to an inner surface of said waterproof section with perforations and covering said perforations, and heat-cooking said food by high frequency electromagnetic wave heating.

10. The food packaging bag of claim 1, wherein said nonperforated waterproof section is heat-sealable waterproof sheet including a paper coated with a polyethylene resin.

11. The food packaging bag of claim 1, wherein said waterproof section with perforations is a perforated heat-sealable waterproof sheet including a paper coated with a heat-sealable resin.

12. The food packaging bag of claim 1, wherein said moisture permeable waterproof film has an air permeability according to JIS P 8117 of not more than 2000 seconds/100 ml and a moisture permeability according to A2 method at 95° C. of JIS L 1099 of not less than 10 $g/m^2$-minute.

13. The food packaging bag of claim 1, wherein said moisture permeable waterproof film is a heat-sealable, finely porous sheet obtained by at least uniaxially stretching a polyolefin sheet containing fine particles.

14. The food packaging bag of claim 13, wherein said moisture permeable water-proof film is a finely porous, heat-sealable film obtained by at least uniaxially stretching a polyolefin sheet containing polyethylene terephthalate fine particles, said polyolefin sheet obtained by admixing a polyethylene terephthalate having an intrinsic viscosity of not more than 0.5 with a polyolefin resin as an incompatible resin with said polyolefin resin and kneading to finely disperse the same.

15. The food packaging bag of claim 1, wherein said moisture permeable waterproof sheet is heat-sealed to said inner surface of said waterproof section with perforation at substantially only fringe parts of said waterproof section with perforations.

16. The food packaging bag of claim 2, wherein said nonperforated waterproof section is a heat-sealable waterproof sheet including a paper coated with a polyethylene resin.

17. The food packaging bag of claim 2, wherein said water-resistant perforated sheet is a perforated heat-sealable waterproof sheet including a paper coated with a heat-sealable resin.

18. The food packaging bag of claim 2, wherein said moisture permeable waterproof film has an air permeability according to JIS P 8117 of not more than 2000 seconds/100 ml and a moisture permeability according to A2 method at 95° C. of JIS L 1099 of not less than 10 $g/m^2$-minute.

19. The food packaging bag of claim 2, wherein said layer of absorbent material comprises a laminate of a heat-sealable fiber sheet layer, a pulp paper layer and a mixed layer of a highly water-absorbent fiber and a heat-sealable fiber, said laminate arranged with said heat-sealable fiber sheet layer adjacent said nonperforated waterproof section, and said heat sealable fiber sheet layer is heat-sealed to said nonperforated waterproof section.

20. (Amended) The food packaging bag of claim 2, wherein said layer of absorbent material comprises a laminate of a heat-sealable fiber sheet layer, a layer containing a highly water-absorbent material and a mixed layer of a highly water-absorbent fiber and a heat-sealable fiber, said laminate arranged with said heat-sealable fiber sheet layer adjacent said nonperforated waterproof section, and said heat-sealable fiber sheet layer is heat-sealed to said nonperforated waterproof section.

* * * * *